United States Patent
Yu et al.

(10) Patent No.: US 7,761,012 B2
(45) Date of Patent: Jul. 20, 2010

(54) OPTICAL COMMUNICATION SYSTEM AND METHOD FOR GENERATING DARK RETURN-TO ZERO AND DWDM OPTICAL MM-WAVE GENERATION FOR ROF DOWNSTREAM LINK USING OPTICAL PHASE MODULATOR AND OPTICAL INTERLEAVER

(75) Inventors: Jianjun Yu, Princeton, NJ (US); Lei Xu, Princeton, NJ (US); Philip Nan Ji, Plainsboro, NJ (US); Ting Wang, Princeton, NJ (US)

(73) Assignee: NEC Laboratories America, Inc., Princeton, NJ (US)

( * ) Notice: Subject to any disclaimer, the term of this patent is extended or adjusted under 35 U.S.C. 154(b) by 603 days.

(21) Appl. No.: 11/621,765

(22) Filed: Jan. 10, 2007

(65) Prior Publication Data

US 2007/0166054 A1   Jul. 19, 2007

Related U.S. Application Data

(60) Provisional application No. 60/746,383, filed on May 4, 2006, provisional application No. 60/743,123, filed on Jan. 12, 2006.

(51) Int. Cl.
H04B 10/04 (2006.01)
(52) U.S. Cl. .................. 398/188; 398/79; 398/182; 398/189; 398/201
(58) Field of Classification Search ............. 398/79–97, 398/188
See application file for complete search history.

(56) References Cited

U.S. PATENT DOCUMENTS 5,710,651 A * 1/1998 Logan, Jr. ................. 398/168

(Continued)

OTHER PUBLICATIONS

Bakaul et al, "Efficient Multiplexing Scheme for Wavelength-Interleaved DWDM Millimeter-Wave Fiber Radio Systems" Dec. 2005, IEEE Photonics Technology Letters, vol. 17, No. 12, pp. 2718-2720.*

(Continued)

*Primary Examiner*—Ken N Vanderpuye
*Assistant Examiner*—Tanya Ngo
(74) *Attorney, Agent, or Firm*—Joseph J. Kolodka

(57) ABSTRACT

A method of generating a dark-RZ pulse in an optical communications system with a dual-arm modulator by setting a direct current bias on the modulator to a specific value such that an output optical power from the modulator achieves a maximum value when the RF signals on the first and second arms of the modulator are off and maintaining the direct current bias at the specific value and applying RF signals to the first and second arms of the modulator and delaying one of the RF signals applied to one of the first and second arms relative to the other of the RF signals such that a dark-RZ pulse is generated with a duty cycle based on the delay. Another aspect of the invention provides a method for generating dense wave division multiplexing (DWDM) optical mm-waves in an optical transmission system by phase modulated DWDM optical signal and applying the phase modulated DWDM optical signal to an input port of an optical interleaver, the optical interleaver having a specified bandwidth to suppress the optical carriers and convert the DWDM optical signal to DWDM optical mm-waves; and amplifying the DWDM optical mm-waves and transmitting the DWDM optical mm-waves over single mode fiber (SMF).

2 Claims, 13 Drawing Sheets

U.S. PATENT DOCUMENTS

| | | | |
|---|---|---|---|
| 5,953,139 A * | 9/1999 | Nemecek et al. | 398/79 |
| 6,226,425 B1 * | 5/2001 | Chang-Hasnain et al. | 385/24 |
| 6,661,974 B1 * | 12/2003 | Akiyama et al. | 398/95 |
| 7,272,319 B1 * | 9/2007 | Piccirilli et al. | 398/89 |
| 7,634,195 B2 * | 12/2009 | Singh et al. | 398/79 |
| 2003/0058504 A1 * | 3/2003 | Cho et al. | 359/161 |
| 2003/0095737 A1 * | 5/2003 | Welch et al. | 385/14 |
| 2003/0169478 A1 * | 9/2003 | Sugiyama et al. | 359/321 |
| 2004/0067006 A1 * | 4/2004 | Welch et al. | 385/14 |
| 2004/0114857 A1 * | 6/2004 | Yan et al. | 385/27 |

OTHER PUBLICATIONS

Bakau et al "Efficient Multiplexing Scheme for Wavelength-Interleaved DWDM millimeter-wave Fiber-Radio Systems", Dec. 2005, IEEE Photonics Technology Letter, vol. 17, No. 12, pp. 2718-2720.*

Di et al "Method of Measuring the RF half-wave voltage of LiNBO3 Optical Modulators" Sep. 2005, Microwave and Optical Technology Letters, vol. 46, No. 5, pp. 440-443.*

* cited by examiner

TRANSMISSION FUNCTION OF LN MODULATOR

DUAL-ARM LN MODULATOR

DARK RZ PULSE GENERATOR

OPTICAL COMMUNICATION SYSTEM AND METHOD FOR GENERATING DARK RETURN-TO ZERO AND DWDM OPTICAL MM-WAVE GENERATION FOR ROF DOWNSTREAM LINK USING OPTICAL PHASE MODULATOR AND OPTICAL INTERLEAVER

CROSS REFERENCE TO RELATED APPLICATIONS

This non-provisional application claims the benefit of U.S. Provisional Application Ser. No. 60/746,383 entitled "Optical Communication System and Method for Generating Dark Return-to-Zero Signal," filed May 4, 2006, and U.S. Provisional Application Ser. No. 60/743,123, entitled "A DWDM Optical Mm-wave Generation for ROF Downstream Link Using Optical Phase Modulator and Optical Inter-leaver," filed Jan. 12, 2006, the contents of which are hereby incorporated by reference herein in their entirety.

FIELD OF THE INVENTION

The present invention relates generally to optical networking, and more particularly, to a methodology of generating a dark RZ pulse using a single intensity modulator, electrical amplifier and phase shifter, and a novel scheme to improve the stability of dense wavelength division multiplexing (DWDM) wave generation without a DC-bias controller.

BACKGROUND OF THE INVENTION

In order to increase spectral efficiency, one possible modulation scheme is to orthogonally modulate amplitude-shift keying (ASK) and differential phase-shift-keying (DPSK) or DQPSK signals. When an ASK signal has a dark-RZ or inversion return-to-zero (inv-RZ) shape, the combined phase signals such as DPSK or DQPSK are not degraded by the ASK signal, therefore the performance of the DPSK or DQPSK after transmission will be higher. See C. W. Chow, H. K. Tsang, "Optical label encoding and swapping using half-bit delayed dark RZ payload and DPSK label", Opt. Express 13, 5325-5330 (2005); S. Pun, C. Chan, and L. Chen, "Demonstration of a novel optical transmitter for high-speed differential phase-shift-keying inverse-return-to-zero (DPSK/Inv-RZ) orthogonally modulated signals", IEEE Photon. Technol. Lett., Vol. 17, No. 12, 2005: 2763-2765; T. Miyazaki, and F. Kubota, "Superposition of DQPSK over inverse-RZ for 3-bit/Symbol modulation-demodulation", IEEE Photon. Technol. Lett., Vol. 16, No. 12, 2004: 2643-2645. Obviously, the key issue for this orthogonal modulation scheme is to generate a dark-RZ pulse. Chow, et al. employed a nonlinear optical loop mirror (NOLM) to generate dark RZ pulse. It is well known that it is difficult to have stable operations using a NOLM and that the NOLM has a high-power consumption. Pun, et al. demonstrated a novel scheme to generate a dark-RZ pulse, where the dark-RZ pulse was used for improving the spectral efficiency for orthogonal modulation format signals. This scheme uses data and inverted data to drive the dual-arm modulator, and then a DPSK signal with a dip can be generated. Since this scheme uses data and inverted data, two electrical amplifiers are necessary to amplifying the data and inverted data prior to driving the dual-arm modulator. This consequently increases costs. Miyazaki used cross-gain modulation (XGM) in a semiconductor optical amplifier (SOA) to generate dark RZ pulse. In this scheme, it is necessary to generate a bright RZ pulse and also requires an SOA and optical filter for XGM. This configuration is complex and expensive.

There has been increasing interest in providing broadband wireless access services in emerging optical-wireless networks. In this regard, optical millimeter (mm)-wave generation is a key technique employed in such networks. Optical intensity modulators can be utilized to generate high-frequency mm waves. However, an electrical control circuit is needed to optimize the direct current (DC) bias added to the external intensity modulator in order to obtain high-quality mm-wave signals. An optical phase modulator does not require a DC bias and thus does not suffer from a DC bias-drifting problem. An external phase modulator followed by an optical notch filter could be utilized to produce optical mm waves. See, G. Qi, J. Yao, et al., "Optical generation and distribution of continuously tunable millimeter-wave signals using an optical phase modulator," J. of Lightwave Technol., Vol. 23, No. 9, 2005: 2687-2695. However, due to the multiple sidebands created by a deep modulation index, the mm-wave generated by this methodology suffered from excessive fiber dispersion, and the transmission distance was thus limited to a few kilometers. Greater distances require dispersion compensation for such radio over fiber (ROF) systems, thereby increasing costs and reducing flexibility of dynamic systems where transmission distances to customer premises over access networks may not be fixed. Since WDM is widely employed, it is desirable to seamlessly integrate WDM or WDM-PON (passive optical network) transport systems with ROF systems.

SUMMARY OF THE INVENTION

In accordance with a first aspect of the invention, there is provided a method of generating a dark-RZ pulse in an optical communications system with a dual-arm modulator having first and second arms, where the modulator is driven by RF signals on each arm, comprising the steps of: setting a direct current bias on the modulator to a specific value such that an output optical power from the modulator achieves a maximum value when the RF signals on the first and second arms of the modulator are off; maintaining the direct current bias at the specific value and applying RF signals to the first and second arms of the modulator; and delaying one of the RF signals applied to one of the first and second arms relative to the other of the RF signals such that a dark-RZ pulse is generated with a duty cycle based on the delay. This methodology provides an economical solution for dark-RZ pulse generation which advantageously employs a single intensity modulator, electrical amplifier and electrical phase shifter. This methodology further provides for the generation of any duty cycle and extinction ratio dark-RZ pulse.

In accordance with another aspect of the invention, a method is provided for generating dense wave division multiplexing (DWDM) optical mm-waves in an optical transmission system. The method comprising the steps of: generating a plurality of CW lightwaves to produce individual wavelength signals with a specified channel spacing; multiplexing the CW lightwaves into a multiplexed DWDM optical signal; intensity modulating the multiplexed DWDM optical signal; phase modulating the intensity modulated DWDM optical signal to produce a phase modulated DWDM optical signal; applying the phase modulated DWDM optical signal to an input port of an optical interleaver, the optical interleaver having a specified bandwidth to suppress the optical carriers and convert the DWDM optical signal to DWDM optical mm-waves; and amplifying the DWDM optical mm-waves and transmitting the DWDM optical mm-waves over single mode fiber (SMF). This methodology advantageously avoids the need to employ a DC bias controller. A relatively small RF signal is employed to drive the phase modulator thereby preventing the generation of higher-order sidebands and limiting the need for dispersion compensation.

These and other advantages of the invention will be apparent to those of ordinary skill in the art by reference to the following detailed description and the accompanying drawings.

DETAILED DESCRIPTION OF THE INVENTION

Embodiments of the invention will be described with reference to the accompanying drawing figures wherein like numbers represent like elements throughout. Before embodiments of the invention are explained in detail, it is to be understood that the invention is not limited in its application to the details of the examples set forth in the following description or illustrated in the figures. The invention is capable of other embodiments and of being practiced or carried out in a variety of applications and in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items.

In accordance with a first aspect of the invention, an economical solution for dark-RZ pulse generation is shown and described. This scheme advantageously employs a single intensity modulator, electrical amplifier and electrical phase shifter. This provides for the generation of any duty cycle and extinction ratio dark RZ pulse.

Figure 1A:
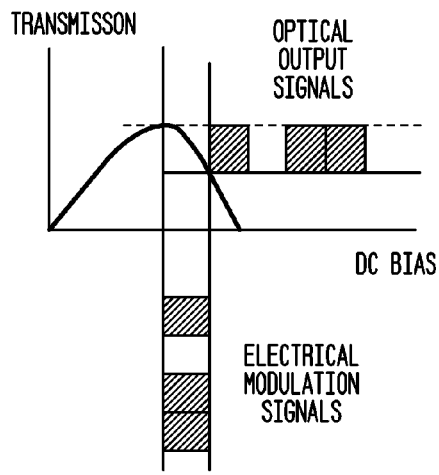
FIG. 1a is a depiction of the transmission characteristics of a dual arm LiNbO3 modulator (LN-MOD) in accordance with an aspect of the invention.
Figure 1B:
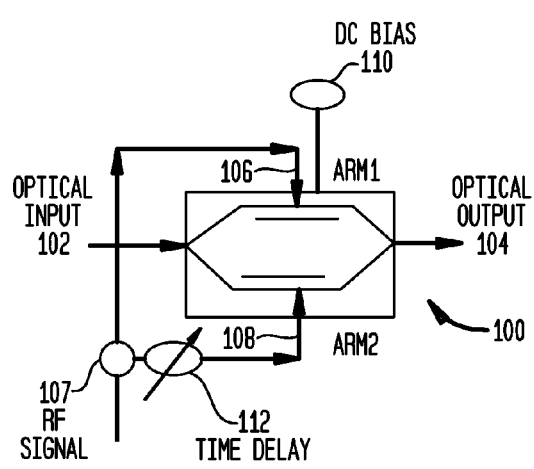
FIG. 1b is a schematic of an exemplary dual arm LN-MOD.
Figure 1C:
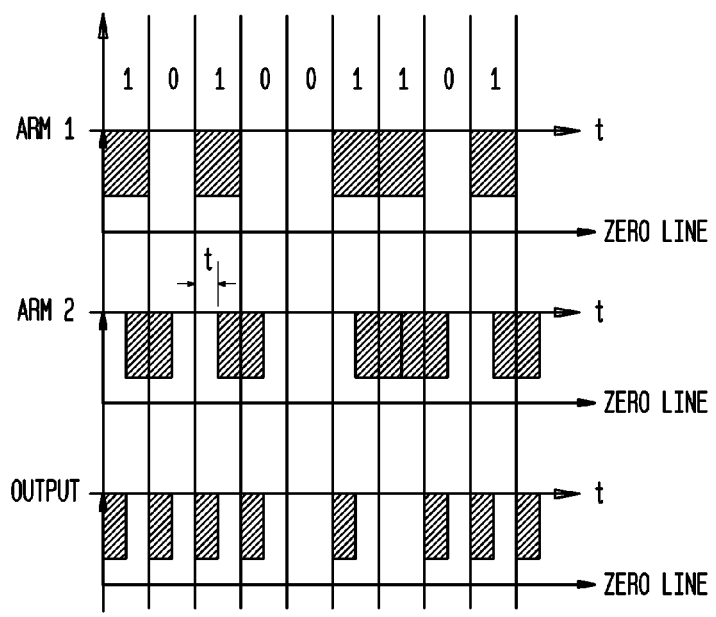
FIG. 1c is a depiction of a dark-RZ pulse generated as the time delay between RF signals that drive respective arms of the dual arm LN-MOD are adjusted as a function of time "t"

Referring to FIGS. 1a-1c, a principle is depicted for dark-RZ pulse signal generation when a binary NRZ signal is used to drive a dual-arm LiNbO3 modulator (LN-MOD) 100 that receives an optical input 102 (CW lightwave) from a distributed feedback semiconductor laser diode (DFB-LD) and produces an optical output 104. The LN-MOD 100 has a first arm 106 and a second arm 108 for receiving electrical RF signals. A DC electric bias is represented by the reference numeral 110. The transmission characteristics of the dual-arm LN-MOD 100 are depicted in FIG. 1a. When a direct current (DC) bias is set as a certain value, the output optical power from the modulator without an electrical RF signal is the maximum. Then, the DC bias is fixed at this value and the RF signals are added to drive the dual-arm modulator. The electrical NRZ signal is divided into two equal parts by a 6 dB power divider 107 and applied to each of arms 106 and 108 as shown in FIG. 1(b). The amplitude of the divided signal is equal to or smaller than the half-wave voltage of the LN-MOD 100. If the amplitude of the divided signal is too small, the dark RZ pulse can not get to zero, therefore the extinction ratio (ER) is small. The ER is defined herein as a ratio of the power of "0" divided by the power of "1". Without RF signals being applied to the arms 106 and 108 of the modulator, the ER is 1 or 0 dB. By adjusting the time delay 112 between the two divided signals, different duty cycle dark-RZ pulses can be generated. FIG. 1(c) graphically depicts how to generate the dark RZ pulse by changing the time delay between the RF signals applied to arms 106 and 108 of LN-MOD 100. The interference between the two arms 106 and 108 in the LN-MOD 100 will result in an output at a maximum or "1" when an RF signal is applied to both arms. When only one of arms 106, 108 has a RF signal at any given time, a dark pulse will be generated as shown in FIG. 1c. By adjusting the time delay between the two RF signals applied to arms 106 and 108, signals with different duty cycles can be generated.

Figure 2:
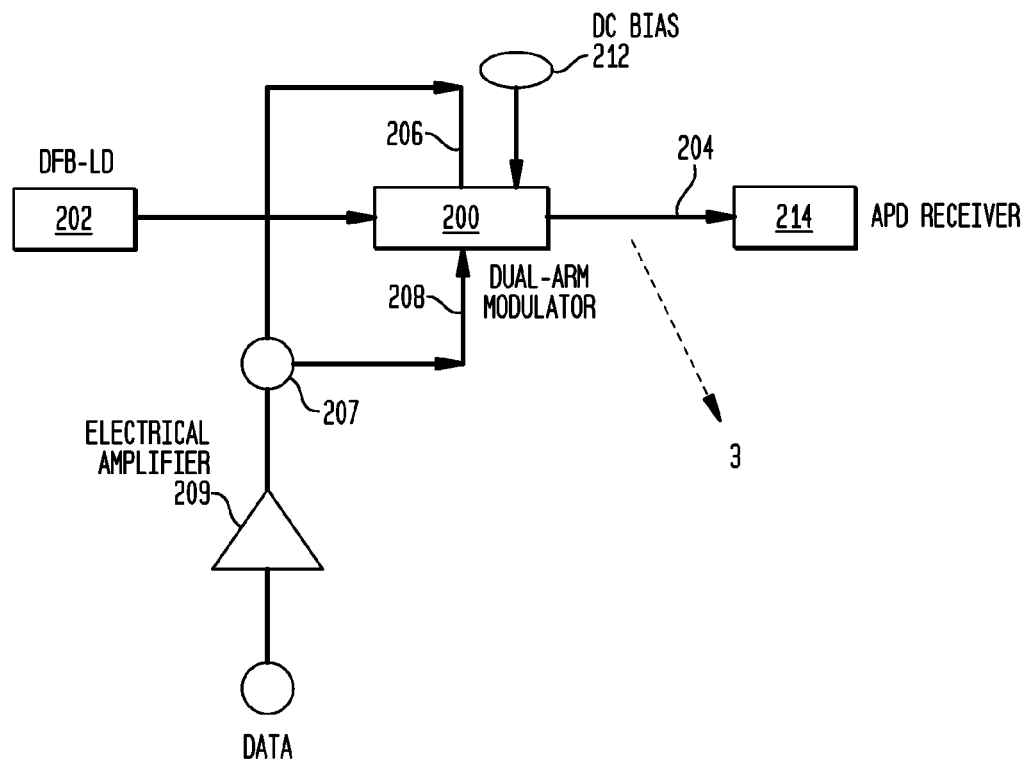
FIG. 2 is a schematic of an experimental setup for dark-RZ pulse generation in accordance with the invention.
Figure 3:
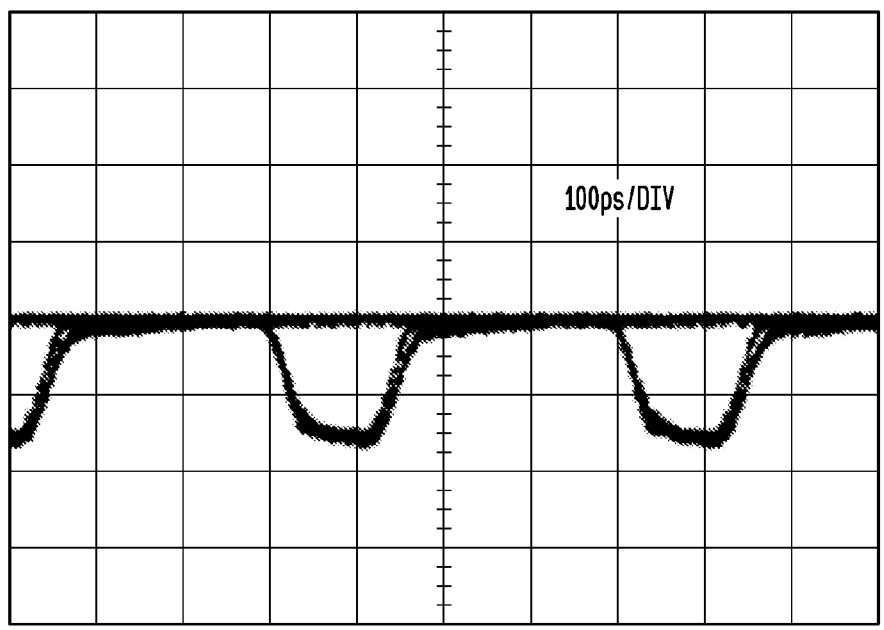
FIG. 3 is an eye diagram of the dark-RZ signals output from the LN-MOD of FIG. 2 at 2.5 Gbit/s.

Referring now to FIG. 2, there is depicted an experimental setup for the generation of a dark-RZ pulse signal. A dual-arm LN-MOD 200 receives an optical input signal operating at a wavelength of 1550 nm and an output power of 10 dBm from a DFB-LD 202. The LN-MOD 200 is driven by electrical RF signals at arms 206 and 208, the electrical RF signals being separated by a 6 dB power coupler 207 driven by an electrical amplifier 209 that produces a peak-to-peak amplitude 7.2 V after amplification at 2.5 or 10 Gbit/s. An electrical and tunable delay line 212 enables the time delay of the RF signal being applied to arm 208 to be adjusted relative to the RF signal applied to arm 206. The DC bias 210 on the LN-MOD is set to produce a maximum output optical power when the driven RF signals are turned off. The dual-arm modulator half-wave voltage is 6V. FIG. 3 is an eye diagram of the dark-RZ signals output from LN-MOD 200 at 2.5 Gbit/s. The pulse-width of the RZ-dark pulse at 3 dB power is around 120 ps.

An avalanche photodiode (APD) receiver 214 with a 3 dB bandwidth of 7 GHz directly detects the dark-RZ signals. In any real application, it will be appreciated by those skilled in the art that an electrical pre-coding circuit will be required in the transmitter or a de-coder in the receiver. In this experimental system, a PRBS signal with a word length of $2^{31}-1$ is generated from a pattern generator, thus obviating the need for a pre-coder or de-coder for BER measurement.

Figure 4:
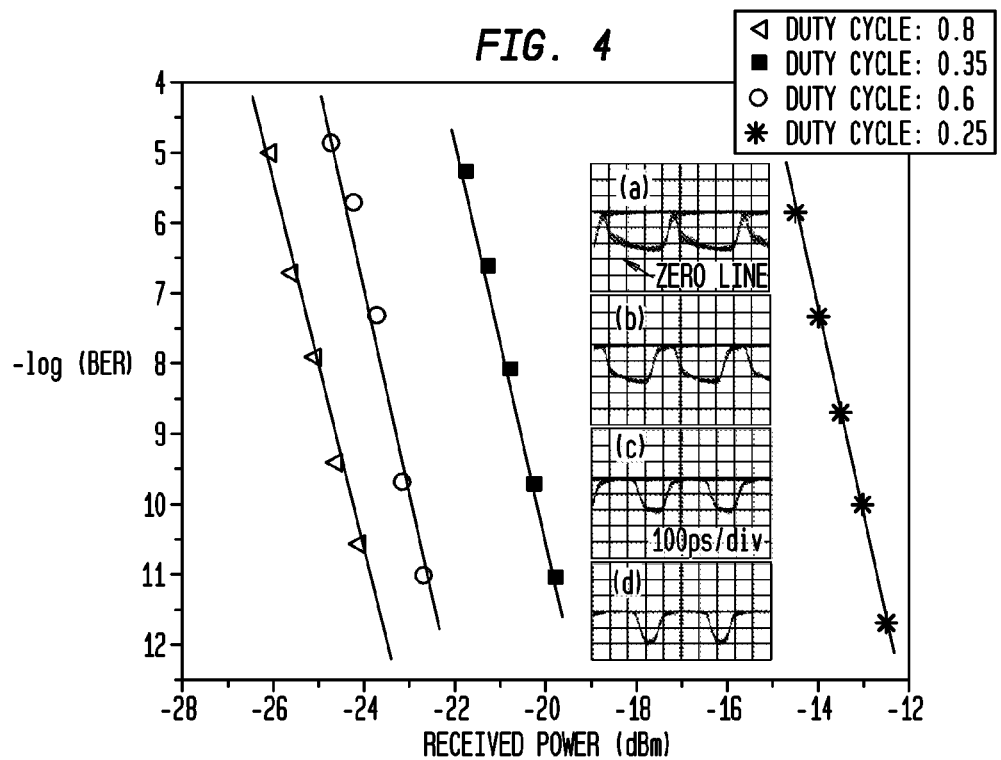
FIG. 4 is a depiction of bit error rate (BER) performance and eye diagrams of dark-RZ pulse signals at 2.5 Gbit/s with duty cycles: (a) 0.8, (b) 0.6, (c) 0.35, and (d) 0.25.
Figure 5:
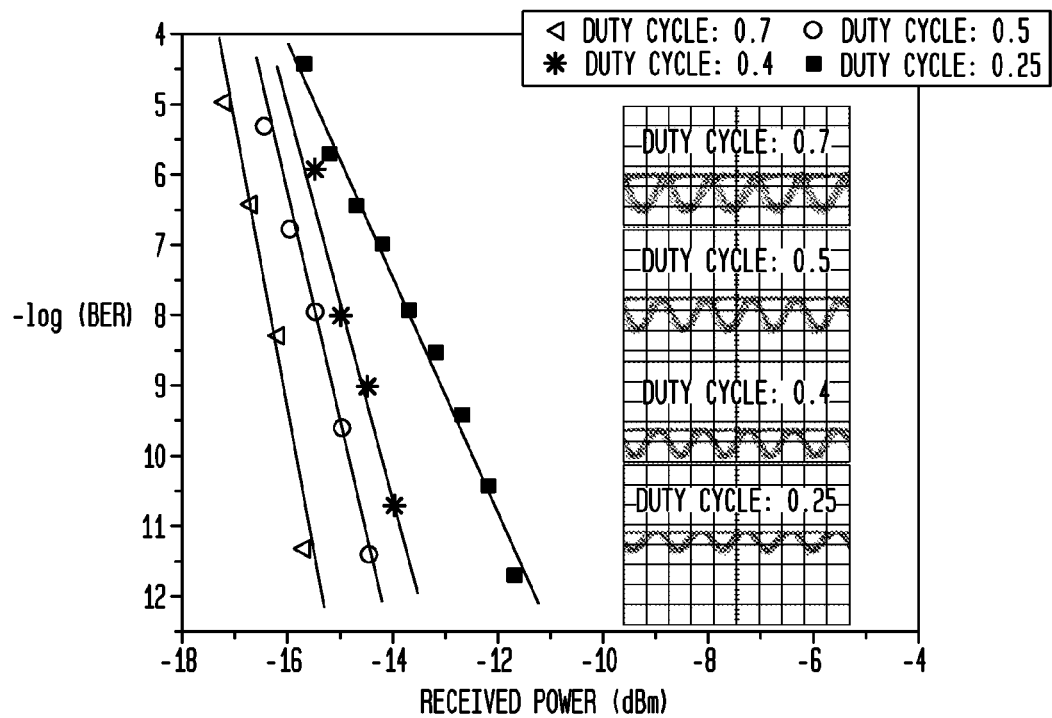
FIG. 5 is a depiction of bit error rate (BER) performance and eye diagrams of dark-RZ pulse signals at 10 Gbit/s with duty cycles: (a) 0.7, (b) 0.5, (c) 0.4, and (d) 0.25.

Referring now to FIG. 4, there is depicted the BER performance and eye diagrams of the dark-RZ pulse at a transmission rate of 2.5 Gbits/s with different duty cycles: (a) 0.8, (b) 0.6, (c) 0.35 and (d) 02.5. An optical port in an oscilloscope having a bandwidth of 30 GHz for eye diagram measurement was employed. Since the amplitude of the RF signal to drive the LN-MOD 200 is not large enough, the maximum ER of the dark RZ pulse is 8 dB. When the duty cycle is small, there is more DC power in the output optical signal from the LN-MOD 200; thus, the receiver sensitivity is low. When the duty cycle is reduced to a minimum number, i.e., 0.25 as represented by eye diagram "d", the ER is reduced to around 4 dB, therefore the receiver sensitivity is much lower than at the higher duty cycles. By comparison, referring now to FIG. 5, there is depicted the BER performance and eye diagrams of the dark-RZ pulse at a transmission rate of 10 Gbit/s with different duty cycles: (a) 0.7, (b) 0.5, (c) 0.4 and (d) 0.25

Figure 6:
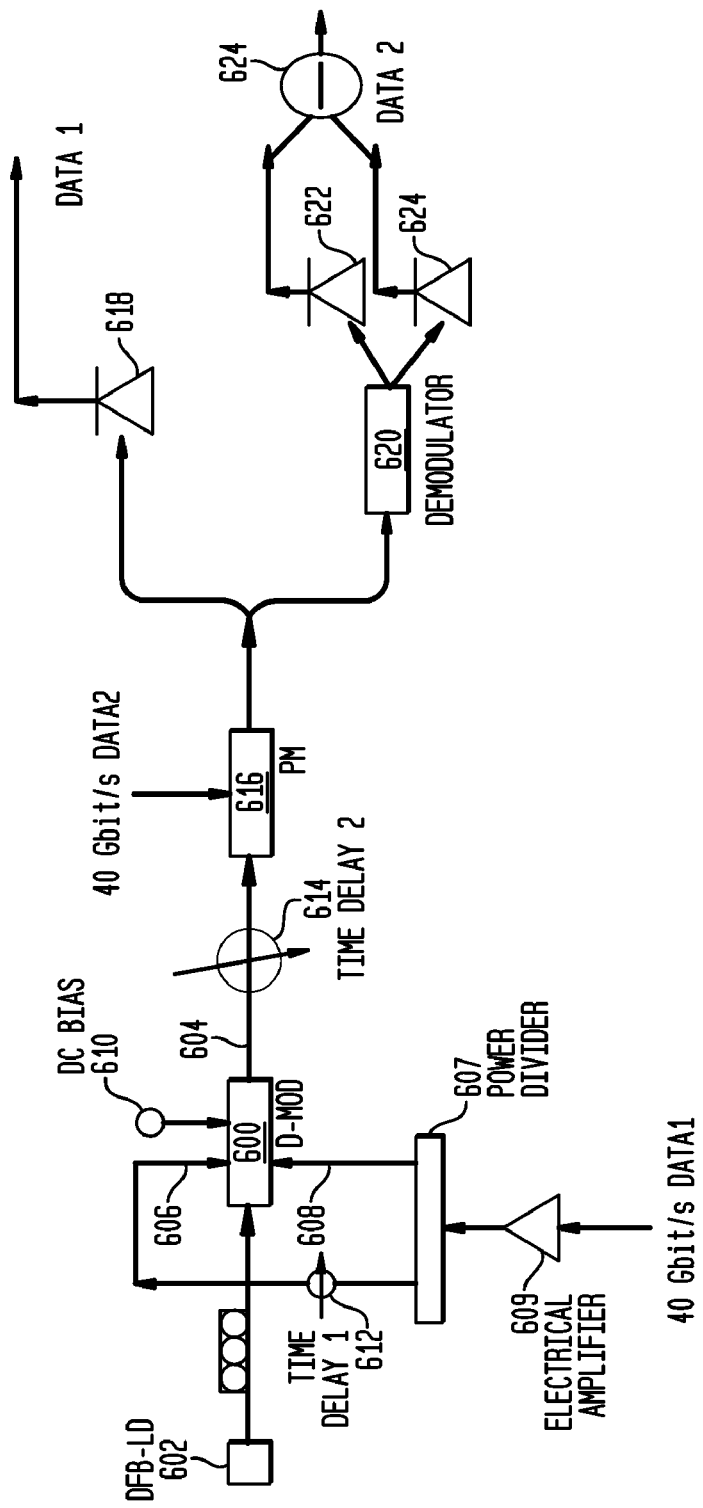
FIG. 6 is an exemplary system that shows how the present invention can be employed for orthogonal modulation of a 40 Gbit/s dark-RZ ASK signal combined with a 40 Gbit/s DPSK signal.
Figure 7:
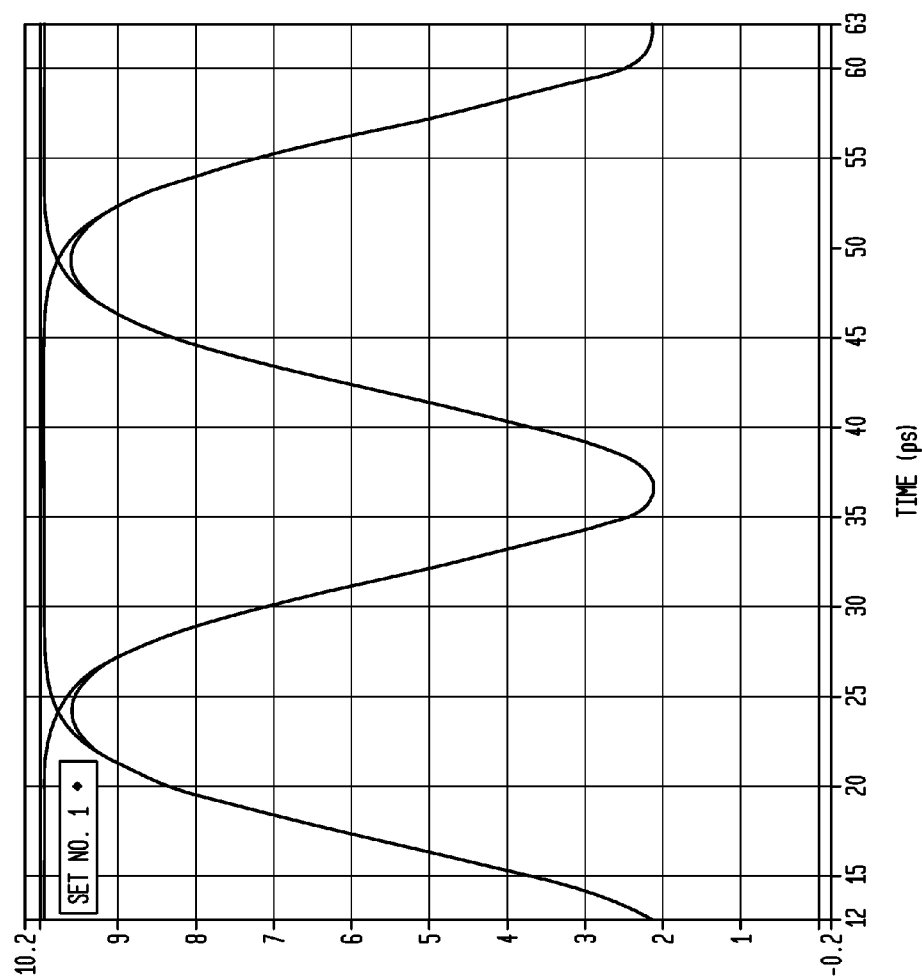
FIG. 7 is an eye diagram of the 40 Gbit/s dark-RZ signal (5 ps/div) as detected by a receiver.
Figure 8A:
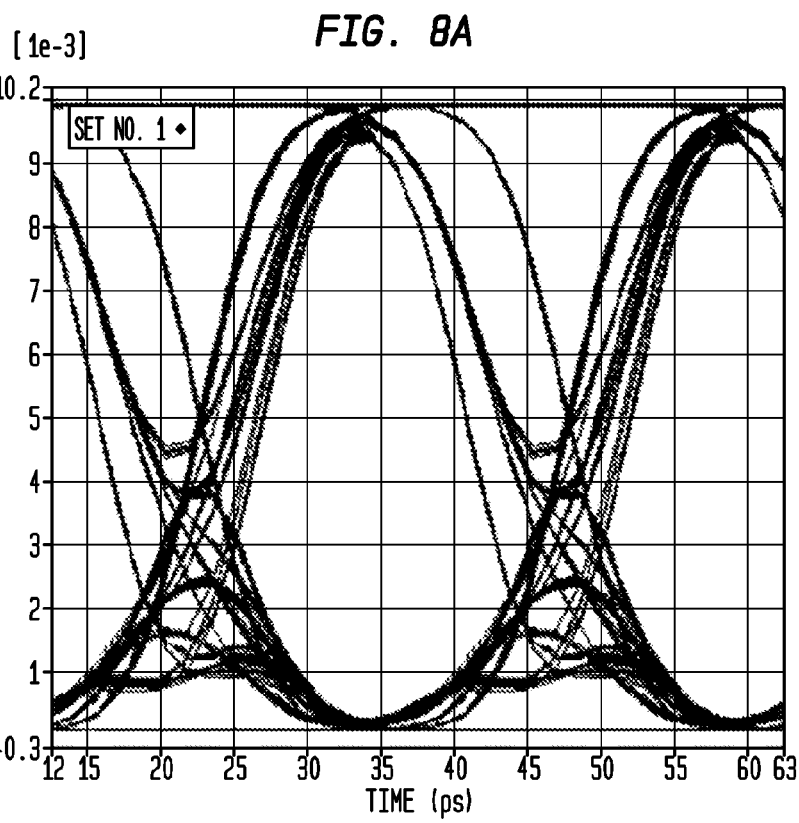
FIG. 8a is an eye diagram of the demodulated DPSK signal at 40 Gbit/s using single arm detection.
Figure 8B:
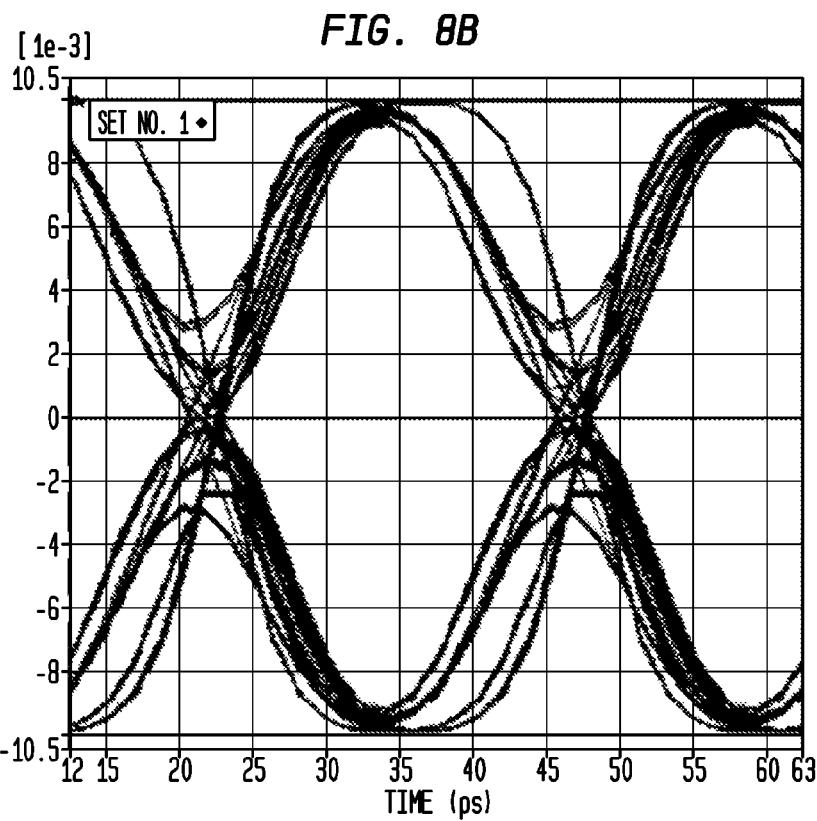
FIG. 8b is an eye diagram of the demodulated DPSK signal at 40 Gbit/s using balanced detection.

FIG. 6 is a schematic of an exemplary system that shows how the present invention can be employed for orthogonal modulation of a 40 Gbit/s dark-RZ ASK signal combining with a DPSK signal. A VPI model using VPI transmission maker was employed to validate the concept. A LD-MOD 600 receives an input optical signal from DFB-LD 602 and outputs an optical signal 604. The LD-MOD 600 includes arms 606 and 608 and DC bias 610. A first stream of data at 40 Gbit/s is amplified by electrical amplifier 609 and split by divider or coupler 607 into electrical RF signals at arms 606 and 608. A first time delay 612 enables the RF signal at arm 606 to be delayed relative to the RF signal on arm 608 as described above. In the simulation, time delay 612 was set to 10 ps. A second time delay 614 between the generated dark-RZ pulse and the electrical signal to drive a phase modulator 616 was set to 18 ps. Phase modulator 616 receives the 40 Gbit/s DPSK signal. The dark-RZ ASK signal is directly detected by a photodiode 618, and the DPSK signal is demodulated by a one-bit delay Mach-Zehnder interferometer 620. The demodulated signal is detected by a single arm or balanced detector comprising photodiodes 622. In the case of balanced detection, the signals are combined at 624. FIG. 7 is an eye diagram of the detected 40 Gbit/s dark-RZ signal with 5 ps/div., FIG. 8a is an eye diagram of the demodulated DPSK signal at 40 Gbit/s using single arm detection, and FIG. 8b is an eye diagram of balanced detection with a 40 Ghz bandwidth of the demodulated DPSK signal.

Figure 9:
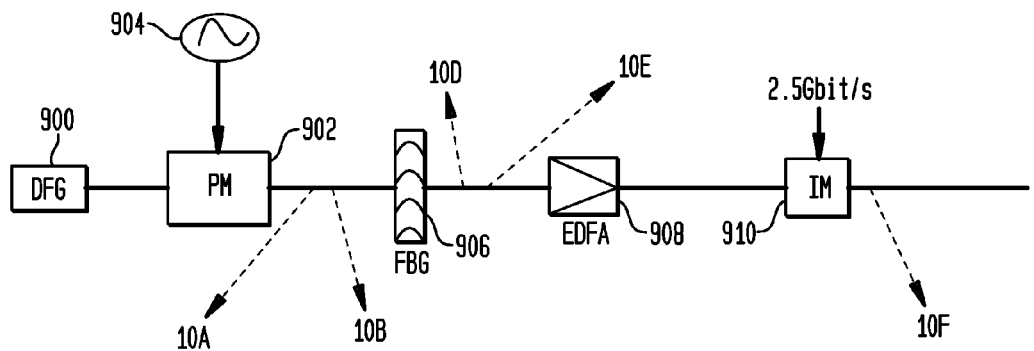
FIG. 9 is a schematic of a system for optical-mm wave generation using a phase modulator in combination with optical filtering in accordance with another aspect of the invention.
Figure 10A:
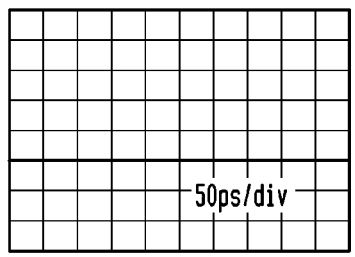
FIG. 10a is a depiction of a waveform produced by a phase modulator (PM) in the system of FIG. 9.
Figure 10B:
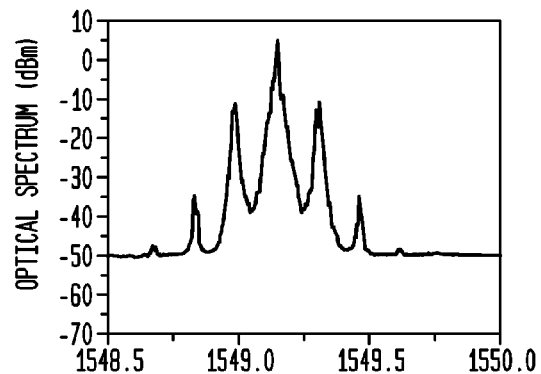
FIG. 10b is a depiction of the optical spectrum of the output of the PM in FIG. 9.
Figure 10C:
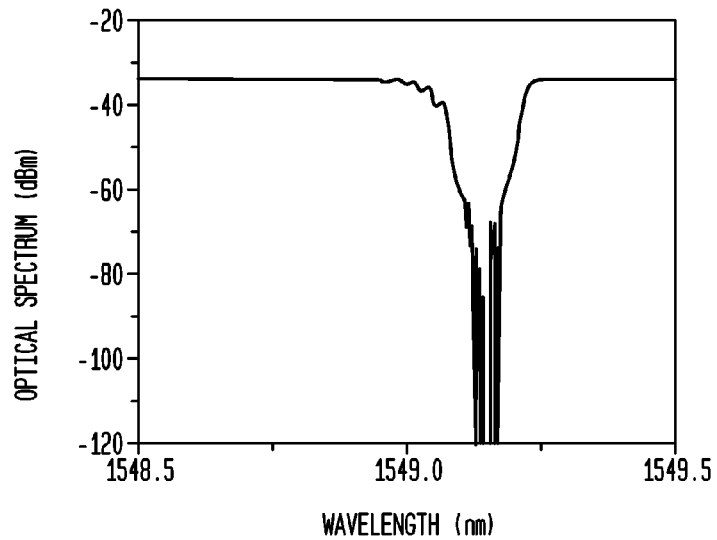
FIG. 10c is a depiction of the transmission spectrum of the Fiber Bragg Grating (FBG) filter in FIG. 9.
Figure 10D:
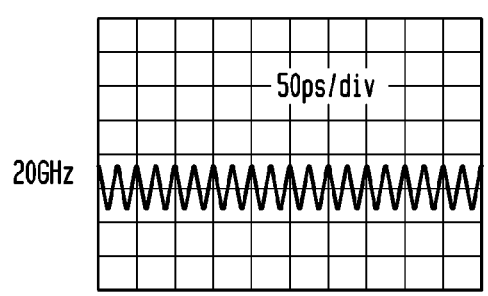
FIG. 10d is depiction of the waveform from the FBG filter in FIG. 9.
Figure 10E:
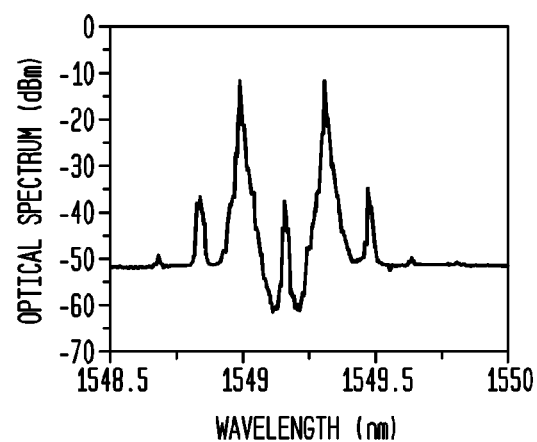
FIG. 10e is a depiction of the corresponding optical spectrum to the output of the FBG filter in FIG. 9.
Figure 10F:
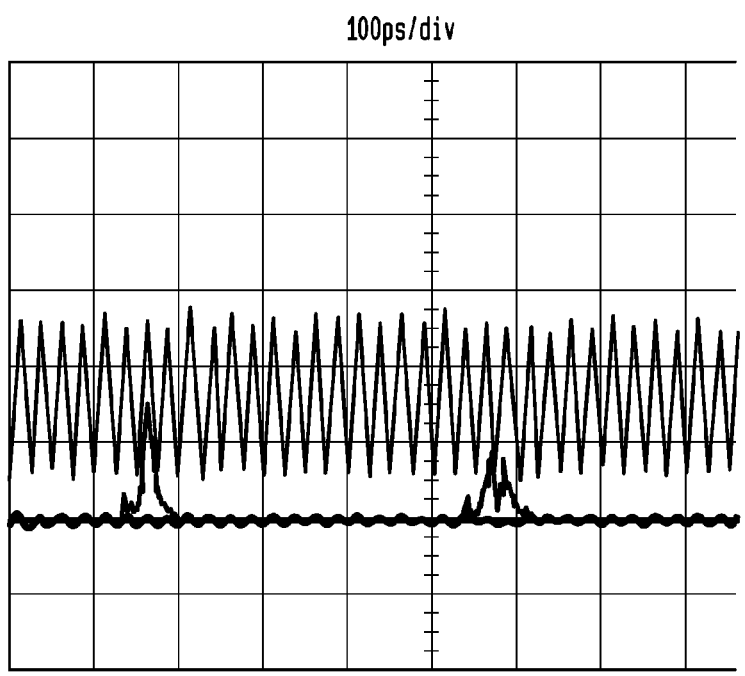
FIG. 10f is an eye diagram of the optical mm-wave signal produced by the intensity modulator (IM) in FIG. 9.

FIG. 9 is a schematic of a system for optical mm-wave generation by using a phase modulator with optical filtering. A DFB-LD 900 generates a CW lightwave at 1549.5 nm. This signal is applied to the input of a LiNbO3 phase modulator (PM) 902. The PM 902 is driven by an RF source 904 producing a 20 GHz sinusoidal wave with a RF voltage of 4V, which produces a waveform as depicted in FIG. 10a and optical spectrum as shown in FIG. 10b. The half-wave voltage of the phase modulator is 11V. Since the driving voltage is smaller than the half-wave voltage of the PM 902, the second order sideband is 25 dB lower than the first order sideband. Thus, the second order sidebands do not largely affect the transmission of the optical wave in single-mode fibers (SMF). A fiber bragg grating (FBG) filter 906 is coupled to the output of the PM 902 to suppress the optical carrier and convert the modulated lightwave to an optical mm-wave. The transmission spectrum of the FBG filter 906 is shown in FIG. 10c. The FBG filter 906 has a 3 dB reflection bandwidth of 0.2 nm and reflection ratio larger than 50 dB at the reflection peak wavelength. The resulting waveform from the FBG filter 906 was detected by a high speed receiver and is shown in FIG. 10d. The corresponding optical spectrum is depicted in FIG. 10e. FIGS. 10d and 10e demonstrate that the mm-wave was successfully generated after passing through the FBG filter 906. The carrier suppression ratio is larger than 25 dB, and the repetition frequency of the optical mm wave is 40 GHz. The optical mm-wave is amplified by an erbium doped fiber amplifier (EDFA) 908 and then modulated by a LN Mach-Zehnder modulator (LM-MZM) 910. The signal is amplified to reach a power of 5 dBm prior to transmission over SMFs of various lengths. The LM-MZM 910 was driven by a 2.5 Gbit/s pseudo-random bit sequence electrical signal with a word length of $2^{31}-1$. Thus, the 2.5 Gbit/s signals are carried by the 40 GHz mm wave. An eye diagram of the optical mm-wave signal is shown in FIG. 10f.

Figure 11:
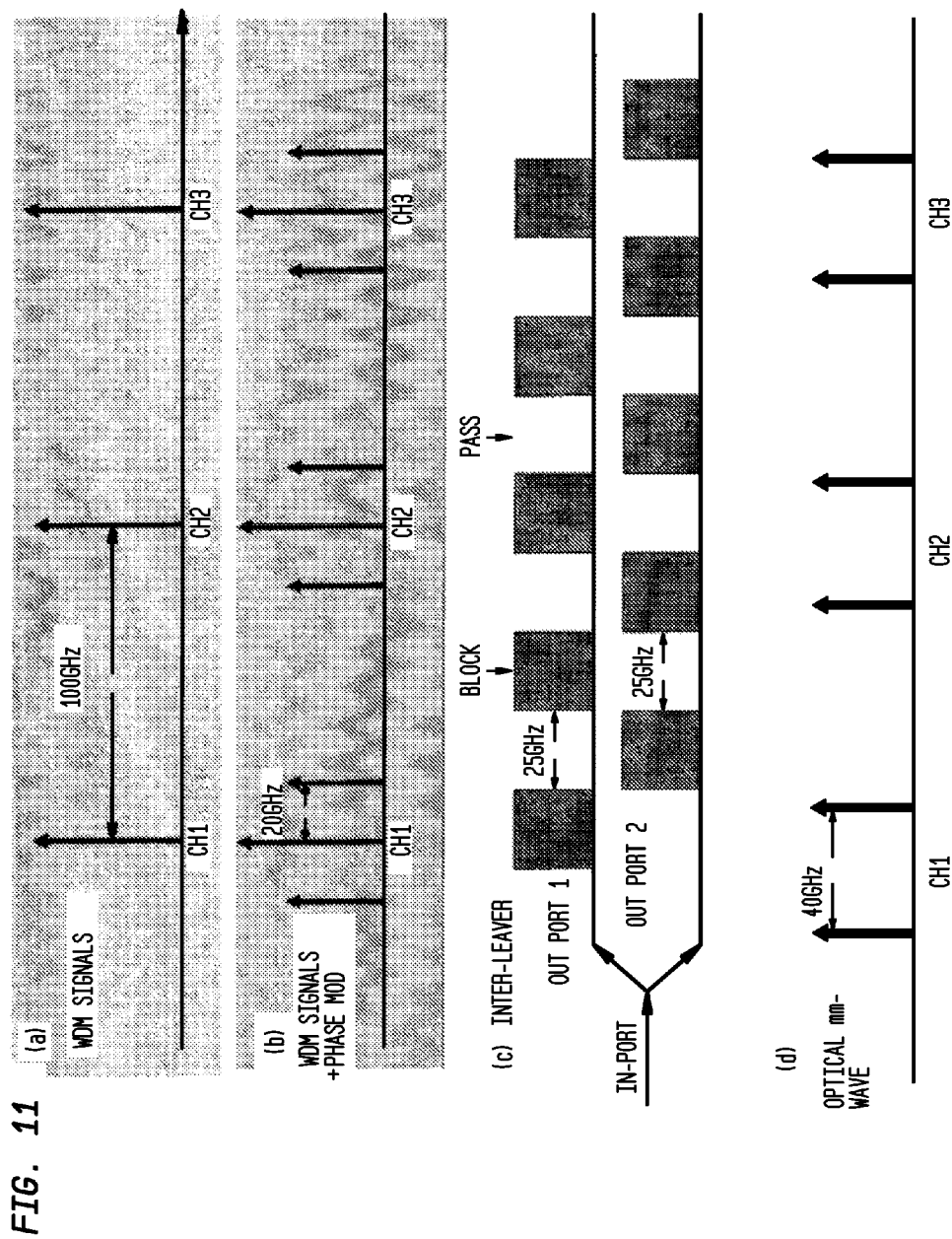
FIGS. 11a-11d illustrate a principal for DWDM mm-wave generation using a PM and optical interleaver in accordance with an aspect of the invention, with FIG. 11a showing 3 DWDM channels at 100 GHz spacing, FIG. 11b depicting the DWDM signals plus phase modulation, FIG. 11c showing the respective output signals from a two-port interleaver, and FIG. 11d depicting the sidebands generated when the PM is driven by a 20 GHz sinusoidal wave.

FIGS. 11a-1d depict a methodology for integrating WDM signals with an ROF system in accordance with an aspect of the invention. As an example, for WDM signals with a 100 GHz channel spacing as shown in FIG. 11a, when the DWDM CW lightwaves are modulated by a PM driven by a 20 GHz sinusoidal wave, some sidebands will be generated. The number of sidebands is dependent on the amplitude of the driven RF signal on the PM. In this case, it is assumed that only the first-order sideband is generated, and that the wavelength of the first sideband is spaced 20 GHz away from the optical carrier of the lightwave as depicted in FIG. 11b. An interleaver with one input, two output ports and a 25 GHz bandwidth to suppress the optical carrier is depicted graphically in FIG. 11c. When the central wavelengths of the WDM light source match the interleaver, the optical carrier of each channel is suppressed after the WDM light source passes through the interleaver. The optical spectrum from output 1 of the interleaver is shown in FIG. 11d. In this manner, an optical mm-wave WDM source is generated.

Figure 12:
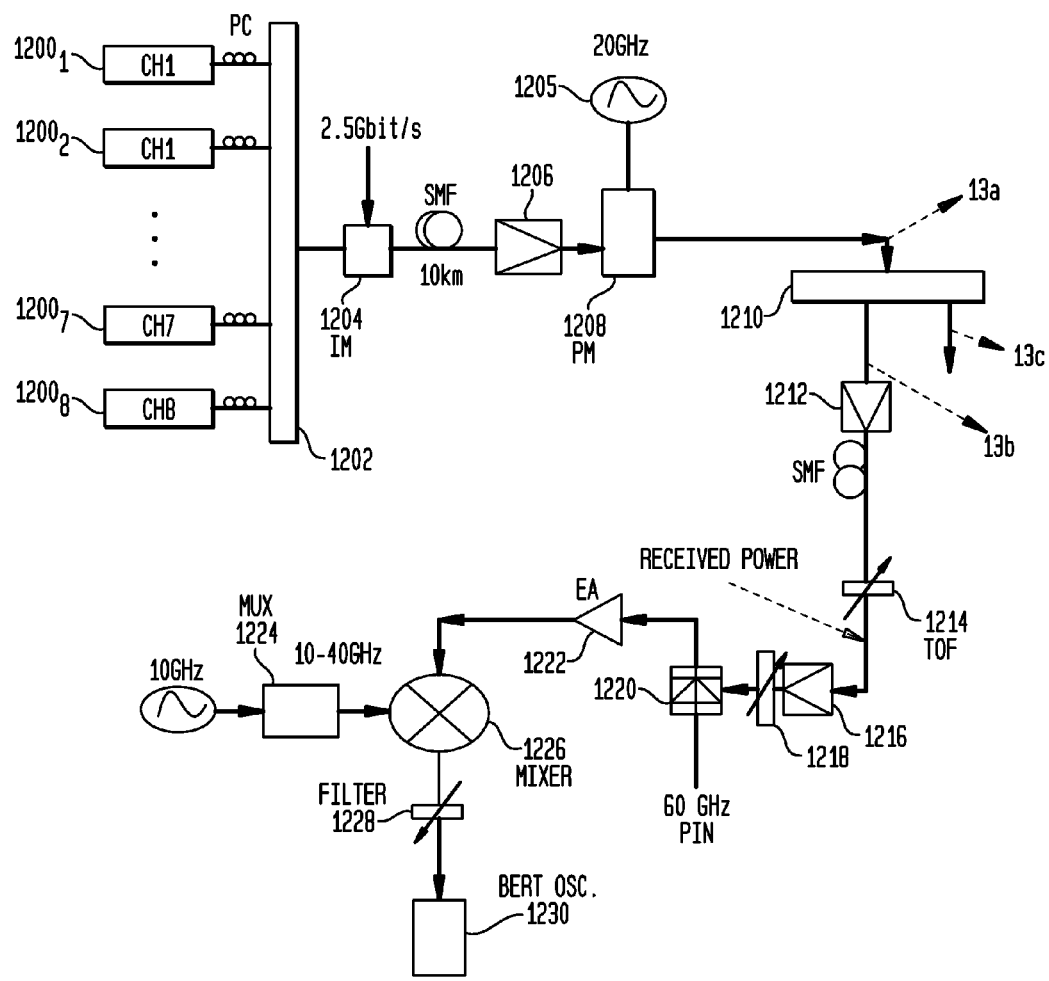
FIG. 12 is a schematic of an experimental setup for optical-mm wave generation using an OCS modulation scheme.
Figure 13A:
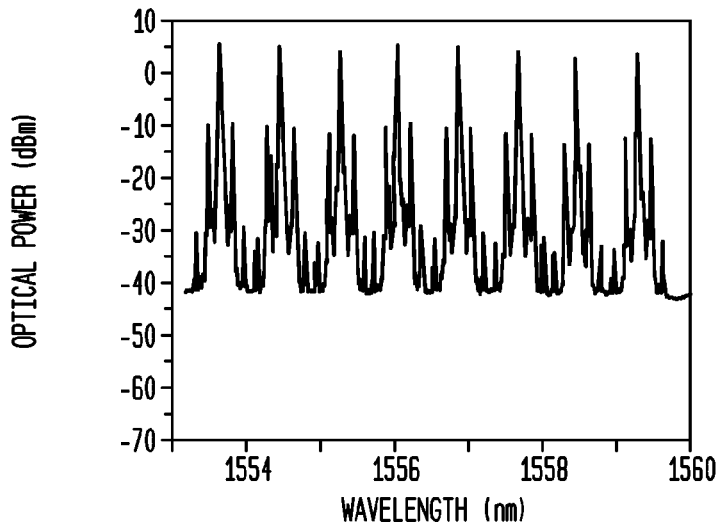
FIG. 13a depicts the optical spectra of the signal after phase modulation and prior to the interleaver in FIG. 12.

FIG. 12 is a schematic of an experimental arrangement for optical mm-wave generation using an OCS modulation scheme. A plurality DFB-LDs $1200_1, 1200_2 \ldots 1200_7, 1200_8$ were used to generate 8 wavelength signals from 1553.7 to 1559.3 nm with 100 GHz channel spacing. The wavelength signals are multiplexed by an arrayed waveguide grating (AWG) multiplexer 1202. The multiplexed signals are then intensity modulated by a LN-MZM 1204 driven by a 2.5 Gbit/s electrical signal 1205 with a PRBS length of $2^{31}-1$. The generated 8×2.5 Gbit/s signals were transmitted over 10 km SMF for de-correlation and amplified by a EDFA 1206. The de-correlated DWDM signals were modulated by a PM 1208 driven by a 20 GHz sinusoidal clock with a peak-to-peak amplitude of 4V. The optical spectrum after phase modulation is shown in FIG. 13a. The half-wave voltage of the phase modulator 11V. Since the driving voltage is much smaller than the half-wave voltage of the PM 1208, the second order sideband of each channel is 25 dB lower than the first order sideband, thus the second order sidebands do not appreciably affect the transmission of the optical-mm wave in SMF fibers.

Figure 13B:
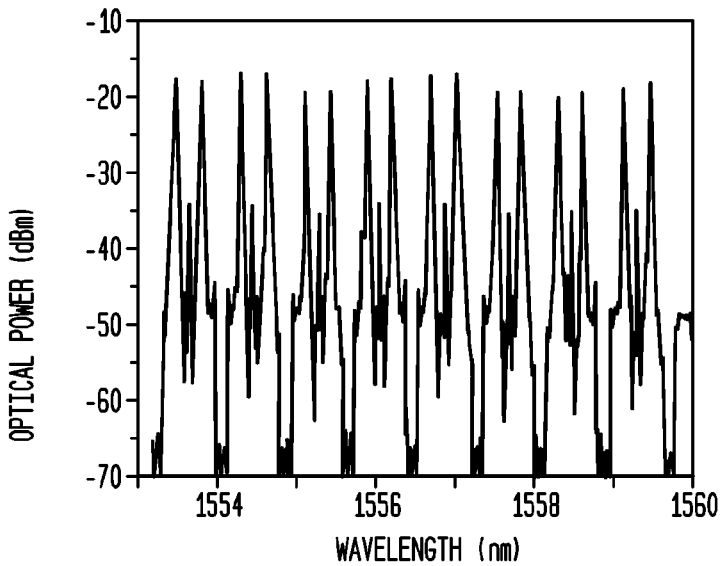
FIG. 13b depicts the optical spectra of the channels on the first output port of the interleaver showing a carrier suppression ratio in excess of 15 dB.
Figure 13C:
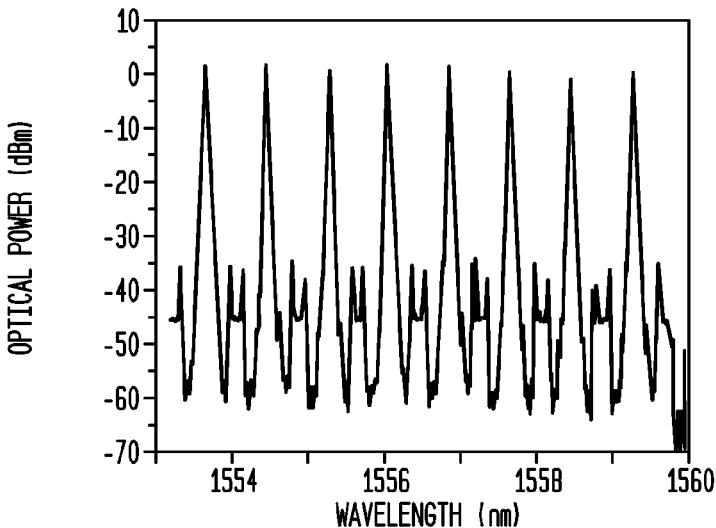
FIG. 13c depicts the optical spectra of the remaining optical carrier on the second output port of the interleaver.

An optical interleaver 1210 with one input port and two output ports was used to suppress the optical carriers and convert the modulated DWDM lightwaves to DWDM optical-mm waves. The carrier suppression ratio of all channels from output port 1 of the optical interleaver 1210 is larger than 15 dB as shown in FIG. 13b, and the repetition frequency of the optical mm wave is 40 GHz. The remaining optical carrier from output port 2 of the optical interleaver 1210 is shown in FIG. 13c. The DWDM optical mm-waves were amplified by EFDA 1212 to a power of 15 dBm prior to transmission over a variable length SMF. At a receiver, the desired channel was selected by a tunable optical filter (TOF) 1214 with a bandwidth of 0.5 mm and preamplified with a EFDA 1216 with a gain of 30 dB, and then filtered by a TOF 1216 with a bandwidth of 0.5 nm prior to optical-to-electrical (O/E) conversion at a PIN PD 1220 with a 3 dB bandwidth of 60 GHz. The converted electrical signal was then amplified by electrical amplifier (EA) 1222 with a bandwidth of 10 GHz centered at 40 GHz. An electrical LO signal at 40 GHz was generated by using a frequency multiplier 1224 from 10 to 40 GHz. The electrical LO signal and a mixer 1226 was used to down-convert the electrical mm-wave signal. This down-converted 2.5 Gbit/s signal was filtered at 1228 and detected by a bit-error-rate (BER) tester 1230. The fiber length was then changed to ascertain changes in BER performance and eye diagrams were generated.

Figure 14:
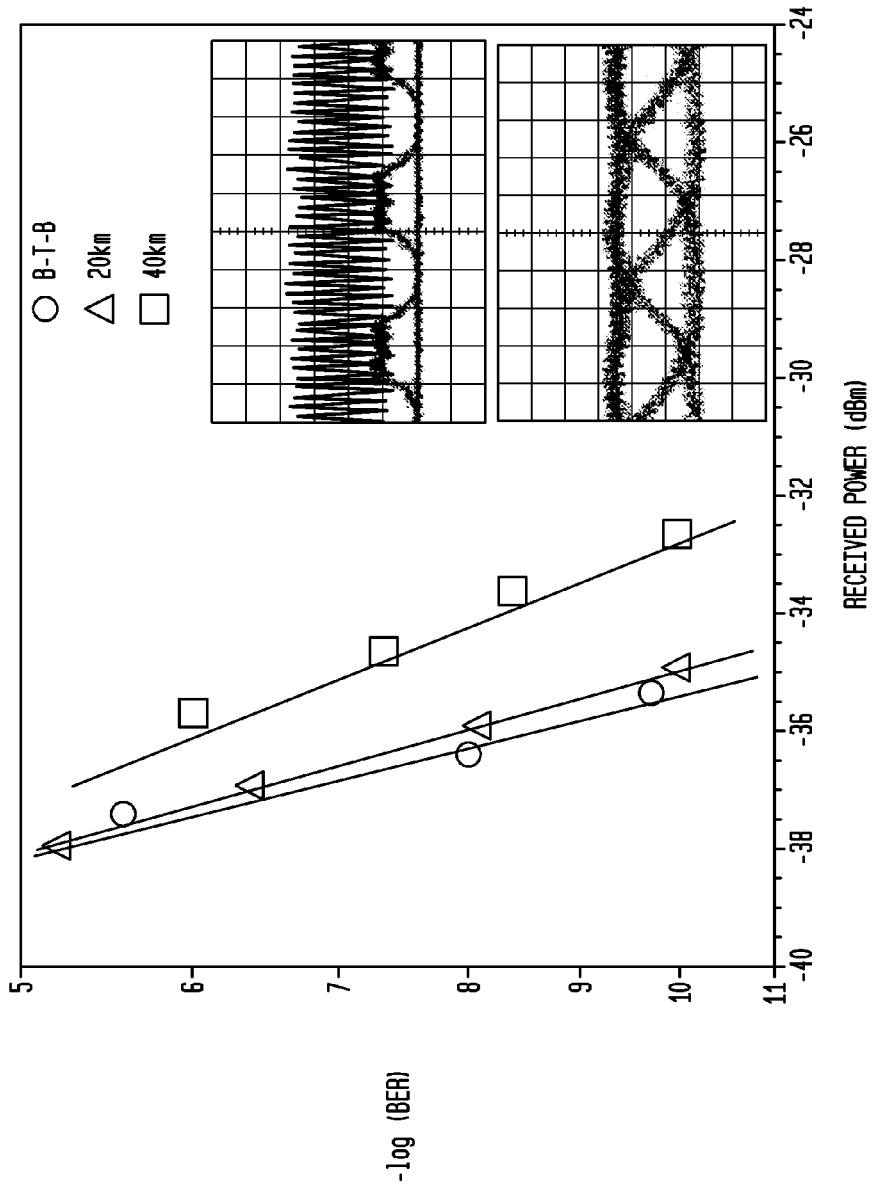
FIG. 14 is a depiction of bit error rate (BER) performance and eye diagrams (100 ps/div) of channel #4 at 1556.1 nm after transmission over a 40 km single mode fiber (SMF) with the upper (optical) eye diagram before down-conversion and the lower (electrical) eye diagram after down-conversion.

FIG. 14 depicts the BER curves and eye diagrams of channel 4 at 1556.1 nm after transmission over a 40 km SMF. For a pure dual-mode mm-wave, it has been demonstrated that the RF power of the optical mm-wave after transmission over 60 km is still maintained even at carrier frequencies as high as 60 GHz. See D. Wake, C. R. Lima, P. A. Davies, "Transmission of 60 GHz signals over 100 km of optical fiber using a dual-mode semiconductor laser source," IEEE Photon. Technol. Lett., Vol. 8, No. 4, 1996: 578-580, the content of which is hereby incorporated by reference herein. The pulse-width of the 2.5 Gbit/s signal carried by the optical wave is approximately 400 ps. The two peaks with a wavelength spacing of 0.32 nm will have a walk-off time of 400 ps caused by fiber dispersion after the mm-wave is transmitted over 74 km SMF with a dispersion of 17 ps/nm/km, which results in full eye closure. In considering the limited rising and falling time of the optical receiver and the electrical amplifier, the maximum transmission distance is thus shorter than 74 km For a BER of $10^{-9}$, the receiver sensitivity for a B-T-B signal is −36.1 dBm. The power penalty after a 20 km transmission is 0.3 dB. At a 40 km distance, the power penalty is 2 dB.

Figure 15:
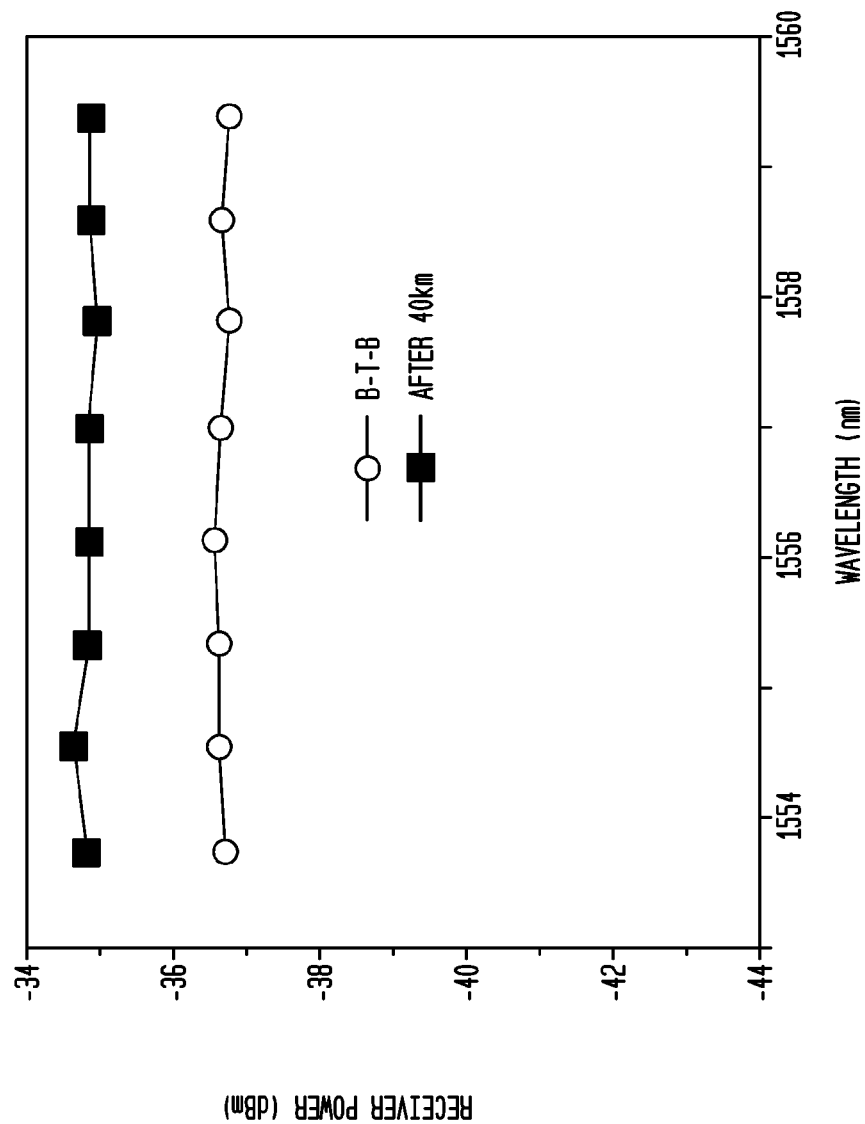
FIG. 15 is a depiction of measured receiver sensitivity at a BER of $10^{-9}$ for eight channels after transmission over the 40 km SMF.

The fiber length for the up-converted signal was set to 40 km. The receiver sensitivity was measured for each channel, and after 40 km the sensitivity for all channels is shown in FIG. 15. It can be seen that the power penalty for all channels is approximately 2 dB after traveling 40 km of SMF. Next, 7 channels were turned off leaving only channel 4 (the middle channel) in operation. Power was reduced to 5 dBm and the power penalty was measured, showing it to be the same as in a multi-channel application. The same result occurred for power reduced to 10 dBm.

The foregoing detailed description is to be understood as being in every respect illustrative and exemplary, but not restrictive, and the scope of the invention disclosed herein is not to be determined from the description of the invention, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention.

What is claimed is:

1. A method of generating dense wave division multiplexing (DWDM) optical mm-waves in an optical transmission system, comprising the steps of:

generating a plurality of CW lightwaves with a plurality of distributed feedback semiconductor laser diodes (DFB-LDs) to produce individual wavelength signals with a specified channel spacing;

multiplexing the CW lightwaves into a multiplexed DWDM optical signal with a arrayed waveguide grating (AWG) multiplexer;

intensity modulating the multiplexed DWDM optical signal with a LN Mach-Zehnder modulator (LN-MZM);

phase modulating the intensity modulated DWDM optical signal to produce a phase modulated DWDM optical signal with a LiNbO3 phase modulator, the phase modulator driven by an RF signal that is smaller than a half-wave voltage of the phase modulator, such that higher-order sidebands are minimized;

applying the phase modulated DWDM optical signal to an input port of an optical interleaver, the optical interleaver having a specified bandwidth to suppress the optical carriers and convert the DWDM optical signal to DWDM optical mm-waves; and amplifying the DWDM optical mm-waves and transmitting the DWDM optical mm-waves over single mode fiber (SMF).

2. The method of claim 1, wherein the DWDM optical mmwaves are amplified by an erbium doped fiber amplifier (EDFA).

* * * * *